J. WINKELMEYER.
COMPUTING CHEESE CUTTER.
APPLICATION FILED DEC. 14, 1911.
1,186,056.
Patented June 6, 1916.
3 SHEETS—SHEET 1.
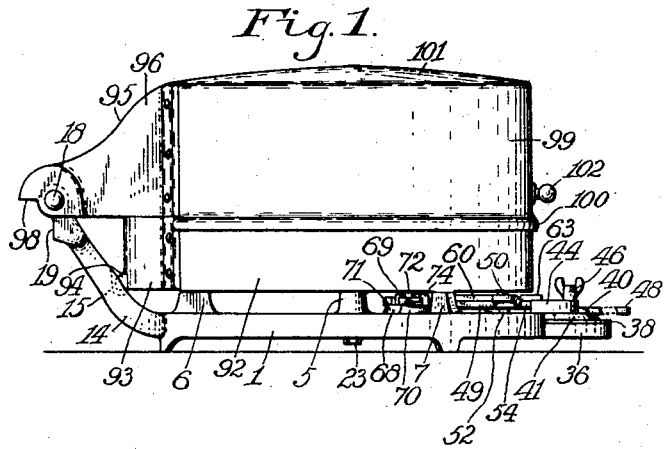
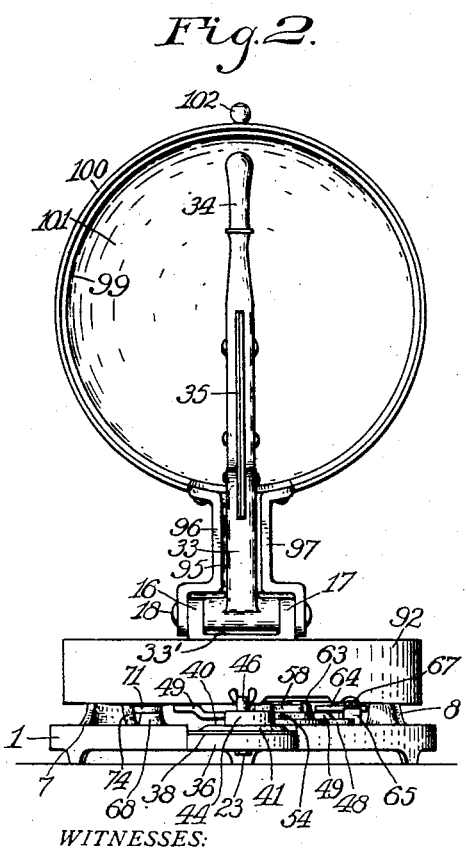
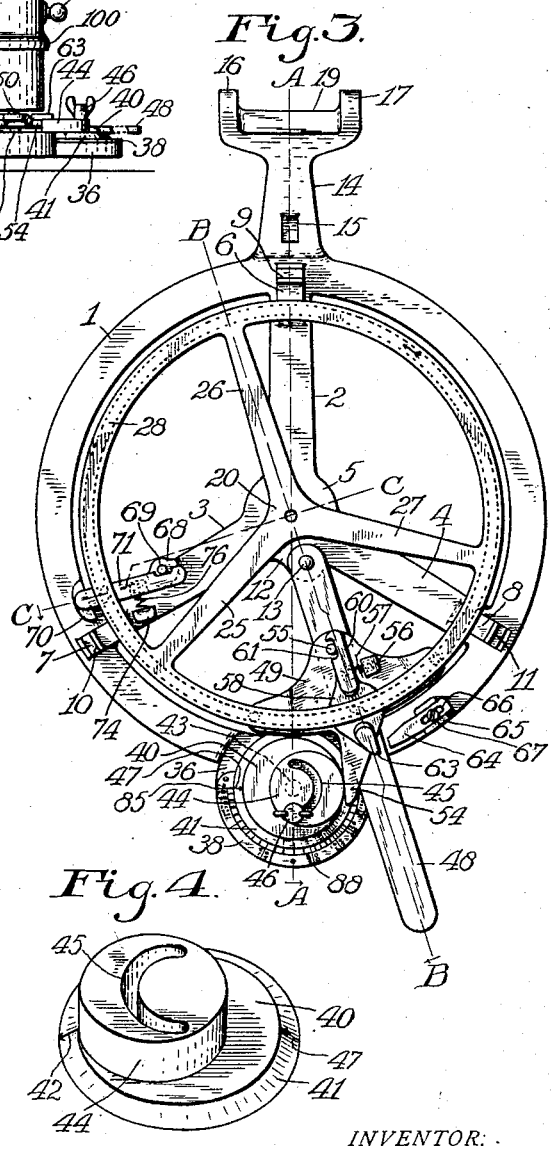
WITNESSES:
J. H. Gardner.
M. L. Wilhelm.
INVENTOR:
John Winkelmeyer,
BY
E. T. Silvius,
ATTORNEY.

J. WINKELMEYER.
COMPUTING CHEESE CUTTER.
APPLICATION FILED DEC. 14, 1911.
1,186,056.
Patented June 6, 1916.
3 SHEETS—SHEET 2.
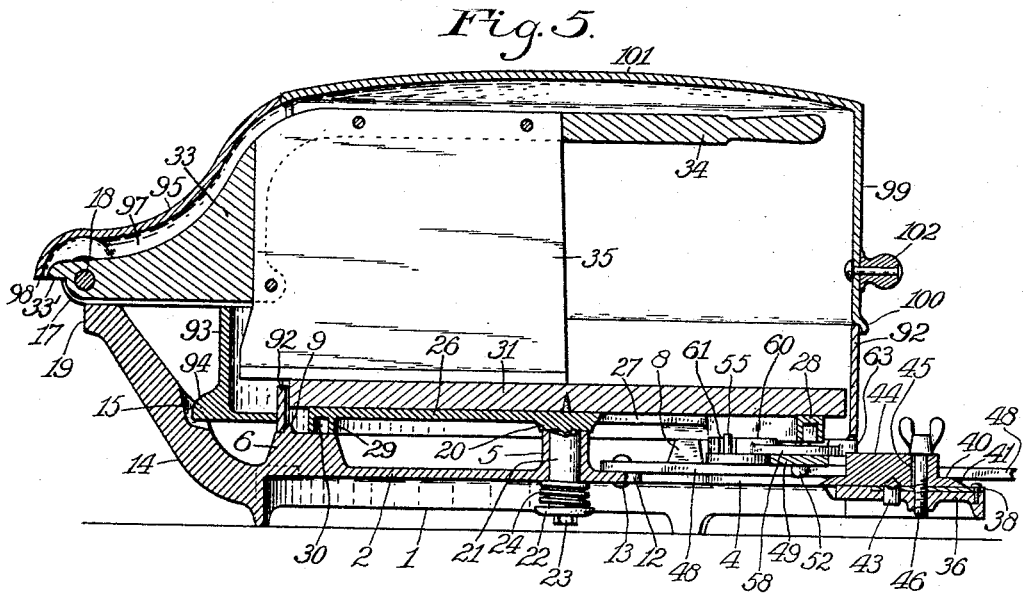
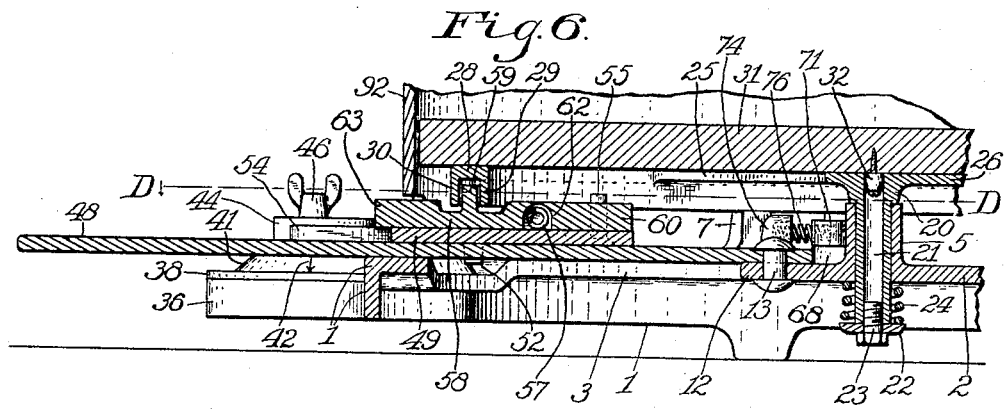
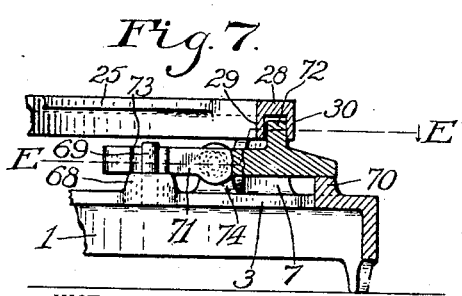
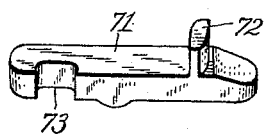
WITNESSES:
J. H. Gardner.
M. L. Wilhelm.
INVENTOR:
John Winkelmeyer,
BY
E. T. Silvius,
ATTORNEY.

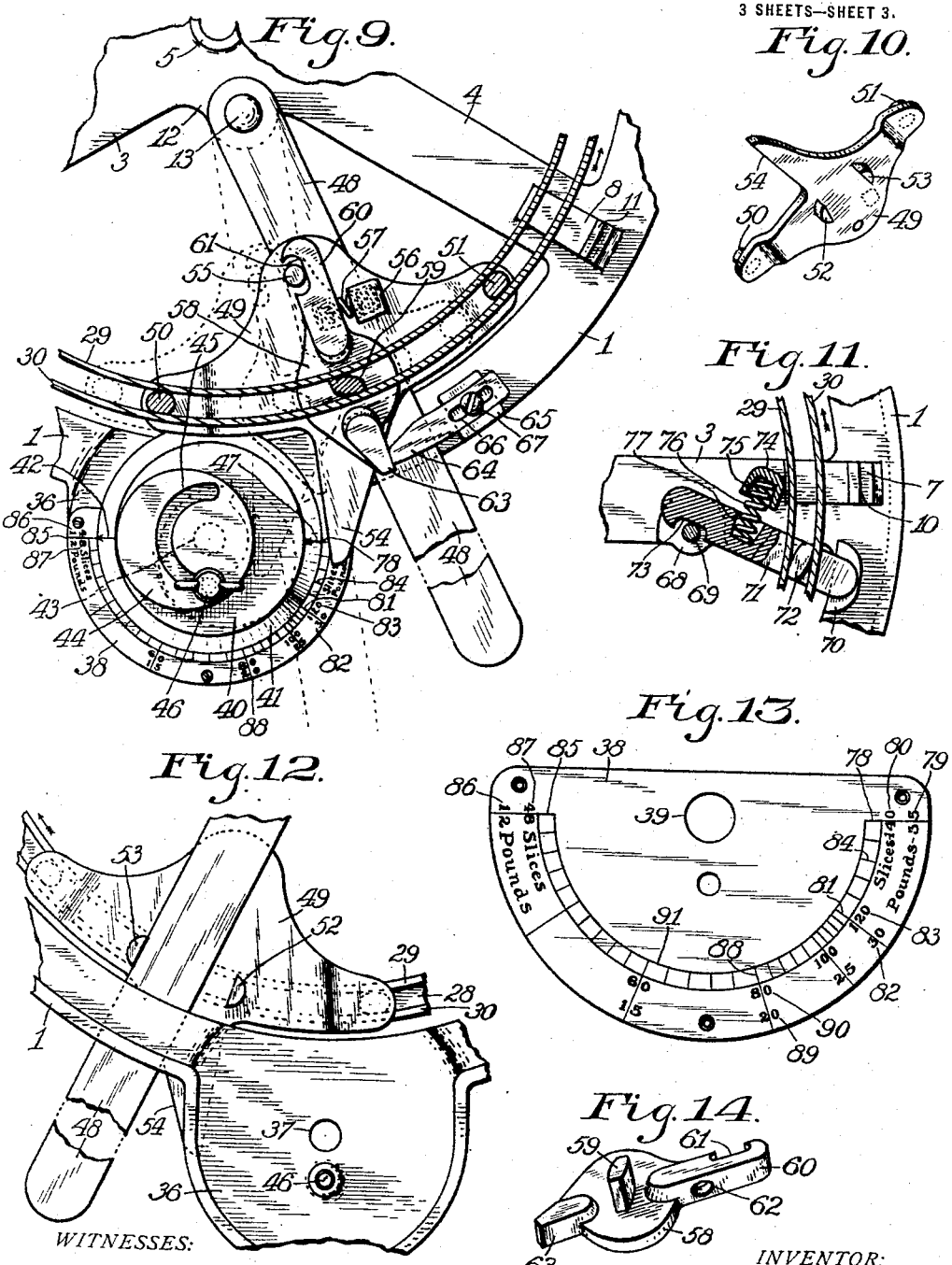

UNITED STATES PATENT OFFICE.

JOHN WINKELMEYER, OF GREENFIELD, INDIANA, ASSIGNOR TO SPECIALTY MANUFACTURING COMPANY, OF GREENFIELD, INDIANA, A CORPORATION OF INDIANA.

COMPUTING CHEESE-CUTTER.

1,186,056.  Specification of Letters Patent.  Patented June 6, 1916.

Application filed December 14, 1911. Serial No. 665,735.

*To all whom it may concern:*

Be it known that I, JOHN WINKELMEYER, a citizen of the United States, residing at Greenfield, in the county of Hancock and State of Indiana, have invented a new and useful Computing Cheese-Cutter, of which the following is a specification, reference being had to the accompanying drawings and to the letters and figures of reference marked thereon.

This invention relates to that type of machine which is designed to divide a cylindrical shaped cheese into measured slices for retailing purposes, the invention having reference more particularly to a cheese cutter that is provided with a cover for keeping flies or other insects from the cheese and the cutting knife when the machine is not in use.

The object of the invention is to provide an improved computing cheese cutter of such construction as to insure accuracy in operation while being simple so as to not be liable to derangement; a particular object being to improve the operating mechanism, the graduating apparatus and the controlling devices which determine the proportions into which the cheese is divided, a further object being to provide an efficient cover for the cheese of such construction and arrangement that it shall be so convenient for use that there shall be little likelihood of its being neglected by the attendant, the aim being to enable the merchant to retail the cheese in a cleanly and sanitary manner.

A still further object of the invention is to provide an improved computing cheese cutter of such design that it may be manufactured in large quantities at relatively small cost and be durable, reliable and economical in use.

With the above mentioned and minor objects in view, the invention consists in an improved computing cheese cutter comprising an improved turn-table and a knife and provided with a novel form of computing scale, a novel adjustable stop block for determining the thickness or number of slices to be cut from a cheese of known cost or weight, improved mechanism for operating the turn-table carrying the cheese, and a novel dust-proof cover for the cheese connected to the machine; the invention consisting further in the novel parts and in the combinations and arrangements of parts as hereinafter particularly described and defined in the accompanying claims.

Referring to the drawings, Figure 1 is a side elevation of the improved cheese cutter shown as when not in use; Fig. 2, a front elevation thereof with the cutting knife and cover elevated so that a cheese may be placed upon the turn-table; Fig. 3, a top plan of the main frame and turn-table frame and also the computing and operating apparatus; Fig. 4, a perspective view of the adjustable stop-block; Fig. 5, a vertical section of the complete machine on the plane of the line A A in Fig. 3; Fig. 6, a fragmentary section on the plane of the line B B in Fig. 7, a fragmentary section on the line C C in Fig. 3; Fig. 8, a perspective view of one of the parts of the appliances for preventing the turn-table from moving backward; Fig. 9, a fragmentary horizontal section on the line D D in Fig. 6; Fig. 10, a perspective view of clutch carrier, being one of the parts of the operating mechanism for the turn-table; Fig. 11, a fragmentary horizontal section on the line E E in Fig. 7; Fig. 12, a fragmentary inverted plan view of the machine; Fig. 13, a top plan of the improved computing scale; and Fig. 14, a perspective view of one of the parts of the operating mechanism as preferably constructed.

Similar reference characters throughout the various figures of the drawings indicate corresponding elements or features of construction herein referred to and described.

In the preferred form of construction the machine comprises an annular main frame portion 1 to which a number of arms 2, 3, 4 are integrally connected, the arms being cast integrally with a hub 5 that is central relatively to the annular portion, the annular portion having a suitable number of bearing blocks 6, 7, 8 on the top thereof, the blocks having upwardly extending guide projections 9, 10, 11 thereon respectively. The blocks preferably are partially on the annular portion and partially on the arms, and the guide projections are on outer portions of the blocks. The hub 5 has a lateral projection 12 thereon that is connected with the arms 3 and 4 and extends toward the forward portion of the frame, and the projection has a pivot 13 thereon. The rear side of the annular portion 1 of the main frame has a projecting frame arm 14 thereon that has a recess 15 in its inner or forward side, the end portion of the arm having two ears 16 and 17 thereon that support a pivot pin 18, said arm having a substantially vertical stop face 19 at the outer side thereof below the pivot pin.

The turn-table or rotary cheese table has a frame comprising a central hub 20 that is supported upon the hub 5 and is provided with a center pin 21 which is rotatably mounted in and extends through the hub 5 and is provided at its lower end with a spring seat 22 that is removably secured thereto by means of a bolt 23, a coil spring 24 being interposed between the spring seat and the under side of the hub 5, the spring preventing the turn-table from turning too freely and therefore constituting a frictional brake. The turn-table frame comprises also a suitable number of arms 25, 26, 27 extending from the hub 20, and an annular portion 28 connected with the ends of the arms, the under side of the annular portion having two concentrically arranged flanges 29 and 30 thereon, the opposite faces of the flanges being turned or finished so as to be true and smooth. A cutting board 31 which constitutes the top of the turn-table for directly supporting the cheese is placed upon the turn-table frame and is suitably centered thereon, preferably by means of a central projection 32 extending into a suitable opening in the hub 20. The flanges 29 and 30 are supported during cutting operations by the bearing block 6 and at all times when excessive weight is placed thereon, by all or any one of the bearing blocks as exigencies may require. A knife frame 33 having an operating arm 34 is connected to the pivot pin 18 and a cutting knife 35 is secured to the frame and its arm so as to rest when not in use upon the turn-table top 31, the pivoted end portion of the knife frame having a heel 33′ thereon so disposed as to engage the stop face 19 when the knife frame is moved on its pivot to approximately upright position, to prevent the knife frame from falling over rearward.

The forward side of the annular portion 1 has a forwardly projecting table 36 thereon that has a shaft-bearing 37 therein. A scale plate 38 is suitably secured upon the table and preferably has a guide opening 39 therein registering with the shaft-bearing 37. The portion of the table that projects beyond the annular portion 1 of the main frame preferably is rounded and the scale plate is shaped approximately like a sector. The top of the table is slightly recessed to receive the scale plate without the plate projecting above the general plane of the table. The table supports an adjustable stop block for determining and governing the degree of movement to be given the turn-table on which the cheese is cut.

The stop block constitutes also, in connection with the scale plate, means for indicating exactly the extent of an adjustment required to enable the machine to divide a cheese of known weight or cost into a particular number of parts or slices. The adjustable stop block preferably comprises a disk-like wheel 40 having a beveled edge 41 on one portion of which is a mark 42 serving as an indicating pointer. The wheel has a stub axle 43 that extends through the guide opening 39 and into the shaft-bearing 37. The wheel has an eccentric block 44 on its upper side which preferably is cylindrical and is eccentrical to the axis of rotation of the wheel. It should be understood, however, that the periphery of the block is not necessarily cylindrical, it being required only that different portions of the periphery shall be at different distances from the axis of rotation of the block. The block has a curved slot 45 therein that extends through the wheel 40 and concentrically to the axis of rotation of the wheel, a binding screw 46 being inserted in the slot and screwed into the table 36, the screw having a winged head engaging the top of the block for securing it to the table when adjusted. The design is such that the full portion of the block 44 or that having the greatest eccentricity is adjacent the indicating mark 42, and it is preferable that the opposite portion of the beveled edge 41 is provided with a mark 47 for convenience in setting the block.

An operating lever 48 is connected at one end with the main frame by means of the pivot 13 and it extends upon and beyond the portion 1 in proximity to the table 36. A novel clutch carrier 49 is provided which is supported preferably on the top of the lever 48 and partially under the annular portion 28 of the turn-table, the carrier preferably being provided with two guide projections 50 and 51 that extend between the flanges 29 and 30 for guiding the carrier relatively to the turn-table and concentrically to the axis of rotation of the turn-table, the lever 48 in operation having a sliding movement under the carrier. The under side of the carrier is provided with two lugs 52 and 53 at opposite sides of the lever that are suitably spaced apart so as to permit some lateral movement of the lever between the lugs. While this provision for idle movement of the lever is not necessary to the mechanism it is an advantageous arrangement, as will further appear. The carrier 49 is so formed as to provide a finger 54 thereon that may pass over the top of the disk or wheel 40 to the stop block 44 for variably limiting the movement of the carrier and also the lever 48 in one direction. The upper side of the carrier 49 has a stud 55 thereon so arranged as to be a short distance inward from the flange 29. The carrier has also an abutment 56 thereon which is somewhat nearer to the flange than the stud and at one side of a plane extending through the pivot 13 and the stud 55, the abutment supporting a coil spring 57 that extends toward such plane. The carrier supports a novel clutch device preferably comprising a flat guide portion 58 having a clutch member 59 thereon that extends upward between the flanges 29 and 30 and is adapted to frictionally grip the flanges when slightly turned in one direction, the member being slightly longer circumferentially of the flanges than the distance between the flanges. The device comprises also an arm 60 extending from the guide member between the spring 57 and the stud 55 and preferably has a recess 61 receiving the studs and also a socket 62 receiving the end portion of the spring. The clutch device comprises also a finger 63 extending from the opposite side of the guide member 58 from the arm and in operation is moved against a stop bar 64 which is secured to a suitable post 65 on the annular portion 1 of the main frame. In order to conveniently determine the length of the stop bar when testing the machine after having been otherwise completed, the stop bar preferably is secured adjustably to the post and this may be accomplished by providing a slot 66 in the stop bar and inserting a screw 67 therein and into the post, and after the stop bar is properly adjusted it is firmly secured to the post, and it will be understood that the stop bar may afterward be readjusted if desired in order to compensate for lost motion in the connections of the clutch mechanism. The spring 57 constantly pushes the arm 60 against the stud 55 and also causes the finger 63 to be moved toward the stop block 44 as far as the clutch member 59 will permit, so that the member 59 stands in clutch position and when moved in the opposite direction must grip the flanges and move the turn-table with it. When the carrier is moved so as to carry the finger 54 toward the adjustable stop block it will be understood that the clutch member 59 is released from gripping action and slides freely backward against the flanges, the spring 57 permitting the relative movement necessary as between the guide plate 58 and the carrier. When the lever 48 is moved against the lug 53 and thereby moves the carrier 49 so as to move the finger 63 to the stop bar 64 while moving the turn-table, it is evident that when the finger 63 is stopped by contact with the stop bar 64 and pressure is still exerted on the lever 48, the gripping contact between the member 59 and the flanges of the turn-table is increased as a safeguard so as to positively stop the turn-table and prevent a possibility of its being carried by momentum farther than the required distance. It will be seen that since the lever 48 is forward of the hub 5 and extends forward beyond the main frame, the projecting handle end of the lever is not required to be excessively long and obtrusive in order to provide sufficient leverage for operating the turn-table, the extent of movement of the outer end of the lever if closely connected to the carrier being relatively small when dividing the cheese into thin slices. This relatively short movement of the lever would tend to give the operator the impression that the turn-table is not moving sufficiently far, and therefore the provision is made for permitting the lever to move some distance before coming in contact with either of the lugs 52 or 53 to move the carrier and thereby move the turn-table.

In order to guard against the turn-table being accidentally moved backward suitable locking apparatus is provided, and for this purpose it is preferable that the arm 3 of the main frame be provided on its top with a bearing block 68 provided on its top with a pivotal stud 69, the portion 1 having also a bearing block 70 thereon, and a lock bar 71 is provided which is slidingly supported upon the bearing blocks 68 and 70 in contact with the stud 69, the bar extending under the flanges 29 and 30 and having a grip member 72 thereon that extends between and in contact with the flanges so as to prevent backward movement but permitting forward movement of the flanges relatively to the lock bar, the latter preferably having a recess 73 in its side for receiving the stud 69. The arm 3 has also an abutment 74 thereon opposite the lock bar that preferably has a socket 75 therein in which a coil spring 76 is seated, the spring forcing the locking bar against the stud 69 and at the same time forcing the locking bar away from the abutment so that the member 72 is slightly turned crosswise between the two flanges of the turn-table and into forcible contact therewith, the locking bar preferably having a socket 77 therein receiving the end of the spring. It will be seen that when the turn-table is moved forward in the proper direction the spring 76 slightly yields, so that the member 72 is moved slightly with the flanges and thus becomes released and when the flanges are stopped is forced backward into gripping engagement with the flanges, and thus prevents backward movement of the turn-table.

The scale plate 38 has a suitable number of marks thereon arranged radially to the guide opening 39 or axis of the stub axle 43, there being a mark 78 that is in register with the mark 42 when the full portion of the eccentric block is turned toward the finger 54, and at the mark 78 a number 79 is placed and also a number 80, the number 79 in the present case being "35" to correspond to the weight of one size of cheese, the number at 80 being "140" to indicate the number of slices or parts into which the cheese will be divided with this adjustment of the stop block. The cost of the cheese being known it can readily be determined as to what the profitable price of each slice shall be. At a suitable distance from the mark 78 is another mark 81, to which the mark 42 may be brought by rotating the wheel 40. At the mark 81 is a number 82 which in the present case is "30", being the assumed weight of the cheese, and another number at 83 which in the present case is "120" to indicate the number of parts into which the cheese will be divided with this setting of the stop block. Between the marks 78 and 81 are a suitable number of divisional marks 84 to any one of which the mark 42 may be brought if required or desired. When the mark 42 is in register with the mark 78 the finger 54 somewhat obscures the marks but in this case the mark 47 is in register with the mark 85 on the opposite portion of the scale plate and in plain view, there being a number at 86 corresponding to the weight of a twelve pound cheese and also a number at 87 adjacent the mark 85 indicating that the cheese will be cut into forty-eight portions or slices. When the stop block is moved slightly so as to bring the mark 42 toward the mark 81 the indicating mark 42 becomes visible and may be set at various points relative to the scale plate, the latter being suitably graduated. A mark 88 is provided between the mark 81 and the mark 85 and is indicated by a number 89, as "20" to correspond to the weight of the cheese and a number 90, as "80" to indicate the number of slices into which the cheese may be cut at a certain price per slice. The marks on the scale preferably extend from a curved line 91 corresponding to the radius of the curvature of the wheel 40. It will be understood that the adjustable stop block 44 may be so set as to permit a cheese irrespective of its weight to be cut into any number of slices desired to be sold at such price per slice as the merchant may determine, and it is evident that the slices will have certain proportions of the weight of the whole cheese.

In order to completely protect the cheese and also the cutting knife and turn-table from dust and insects a cover is provided which preferably is composed of two sections, one a stationary section comprising a cylindrical wall or casing 92 which is supported upon the bearing blocks 6, 7, and 8 against the guide projections thereon, and it surrounds the turn-table and in its rear portion has an opening suitably arranged to clear the rear end of the cutting knife 35, a closure 93, however, being secured to the stationary section and is adapted to extend around the end of the knife, and it has a guide projection 94 thereon extending into the recess 15 in the arm 14 to hold the stationary section in fixed position to practically form a part of the main frame and so as to not interfere with the movement of the knife. The wall 92 of the stationary section extends upward to a plane nearly as high as the pivot pin 18. The remaining one of the two sections of the cover is movable and comprises a hollow arm which preferably is formed as a casting and comprises a top portion 95 and two side portions 96 and 97, the latter being suitably shaped so as to embrace the outer sides of the ears 16 and 17 and are connected to the pivot pin 18. The arm is hood-like so as to cover the knife frame, and the under side of its hinged extremity is formed so as to provide a stop shoulder 98 to be moved into contact with the stop face 19 of the supporting arm. The arm of the cover is adapted to normally rest upon the part 93 and it has a cylindrical side wall or casing part 99 secured thereto which rests upon the wall 92 and preferably has a guide flange 100 thereon, a circular crown or top 101 being connected to the side wall 99 and to the top portion 95 of the cover arm. Preferably the forward portion of the side part 99 has a handle 102 thereon for conveniently moving the movable part of the cover on its pivot or hinge connection. When the knife 35 is resting on the cutting board 31 the knife and its frame and operating handle are entirely covered as is also the cheese that may be on the cutting board.

In practical use the movable section of the cover is standing in upright position on its pivot, and the cutting knife being moved upward and rearward so as to be out of the way of the cheese, the lever 48 is moved so as to bring the finger 54 against the stop block 44 if not already in such position, and then the lever 48 is moved in the opposite direction until stopped by the finger 63 coming in contact with the stop bar 64, the operation causing the turn-table to move the desired distance and then the cutting knife is brought down so as to cut the required slice from the bulk of cheese. The functions and results of operation of the various elements of the machine will be readily understood from the foregoing description without further reference thereto in detail.

Having thus described the invention, what is claimed as new is—

1. A cheese cutter including a frame having a casing wall thereon, a turn-table mounted on the frame and surrounded by the casing wall, and a cheese cover hingedly connected with the frame and normally supported upon the casing wall.

2. A cheese cutter including a main frame, a turn-table mounted on the main frame, an inclosing wall supported on the main frame and extending about the turn-table, and a cheese cover hingedly connected with the main frame and normally supported upon the top of the inclosing wall.

3. A cheese cutter including a main frame, a turn-table mounted on the main frame, a knife frame pivotally connected with the main frame, a knife secured to the knife frame to operate upon the turn-table, and a cover comprising a top and also a side wall divided on a horizontal plane and extending continuously about the turn-table, the upper part of the cover being pivotally connected with the knife frame and the main frame.

4. A cheese cutter including a rotatable cheese table, a pivoted lever, a clutch carrier slidingly mounted on the lever, a clutch device movably mounted on the carrier for moving the table, an adjustable stop block supported in the path of movement of the carrier, and a stop supported in the path of movement of the clutch device when carried by the carrier.

5. A cheese cutter including a main frame, a cheese table frame rotatably mounted on the main frame and having two concentric flanges thereon, a lever pivoted to the main frame, friction-clutching means movably mounted on the lever and coöperating with the two flanges to rotate the table frame, the lever having limited idle movement relative to the friction-clutching means, and stop devices mounted on the main frame for limiting the movement of the lever.

6. A cheese cutter including a frame having a projecting table thereon, a fixed stop on the frame, a disk having an eccentric block thereon and rotatably mounted on the table substantially opposite the fixed stop, means for securing the disk to the table, a turn-table mounted on the frame, and means movably mounted on the frame and limited in movement by the block and the stop for moving the turn-table.

7. A cheese cutter including a main frame having a continuous casing wall thereon, a table rotatably mounted on the frame and surrounded by the casing wall, a knife frame pivotally connected with the main frame, a knife secured to the knife frame and movable thereby onto the table, and a cover comprising a continuous wall and a continuous top fixed thereto and hingedly connected with the main frame, the wall of the cover being normally seated removably upon the casing wall, to cover the table and the cheese thereon and also the knife frame and the knife.

8. A cheese cutter including a turn-table, a lever for periodically moving the turn-table, a stop for limiting the forward movement of the turn-table, a supported graduated sector, a substantially eccentrically shaped stop block provided with a guide and also a fastener and having an indicator mark thereon to be brought to the sector graduations, the eccentrically shaped stop block being supported opposite the lever for governing the backward movement thereof.

9. A cheese cutter including a main frame provided with a rotatably adjustable stop block and also a fixed stop, the block being substantially cylindrical and eccentrically supported on the frame, a rotary frame mounted upon the main frame, and means for rotating the rotary frame including a lever provided with a clutch carrier having a clutch, the carrier being movable to the adjustable stop block and the clutch to the fixed stop and coöperating therewith to determine the rotary movement of the rotary frame.

10. A cheese cutter including a main frame having an indicator table on one side thereof, a stop supported on the frame in proximity to the indicator table, a turn-table mounted on the main frame, a lever pivoted to the main frame and extending opposite one side of the stop, means mounted on the lever coöperating therewith for moving the turn-table when the lever is moved toward the stop, and a rotatably adjustable stop block on the indicator table for variably limiting the movement of the lever in the opposite direction.

11. A cheese cutter including a main frame having an indicator table on one side thereof, a stop block adjustably mounted upon the indicator table, a fixed stop mounted on the main frame at a distance from the stop block, a lever pivoted to the main frame and extending between the stop block and the fixed stop, a clutch carrier mounted on the lever and movable thereby into contact with the stop block, a friction-clutch device mounted on the carrier and movable thereby into contact with the fixed stop, and a turn-table mounted on the main frame to be operated by the friction-clutch device.

12. A cheese cutter including a frame, a stop fixed on the frame, a table fixed on the frame, a disk-shaped base rotatably mounted on the table and having a cylindrical stop block thereon that is eccentric to the axis of rotation of the base, the base having a bevel edge provided with a mark, a device for securing the base against rotation on the table, a computing scale fixed on the table and extending along the bevel edge of the base, a lever pivoted to the frame, a carrier on the lever and movable thereby to the stop block, a turn-table mounted on the frame, and clutch mechanism mounted on the carrier for moving the turn-table and provided with a finger that is movable into contact with the fixed stop.

13. In a cheese cutter, the combination of a main frame having an upright continuous casing wall thereon, the wall having an outwardly offset portion, a knife frame hingedly connected with the main frame in proximity to the offset portion of the wall, a table rotatably mounted on the frame and surrounded by the casing wall, a knife secured to the knife frame and movable thereby onto the table and partially into the offset portion of the wall, and a cover normally seated removably upon the casing wall to cover the table and the knife, the cover having an offset portion normally seated upon the offset portion of the casing wall, the cover being hingedly connected with the main frame.

14. In a cheese cutter, the combination with a main frame, a turn-table rotatably mounted on said frame and having two concentric flanges thereon, and means for rotating the turn-table in one direction, of a locking bar movably mounted on the main frame and having a clutch member thereon extending between the two flanges, means for holding said bar to the main frame, and means for moving said bar to turn said member into forcible contact with said flanges to lock said turn-table against rotation in an opposite direction.

15. In a cheese cutter, the combination with a main frame, a lever pivoted to the main frame, and a turn-table frame rotatably mounted on the main frame and having two concentric flanges extending over the lever, of a carrier supported on the lever and having two guide projections thereon extending between said flanges for guiding the carrier, means enabling the lever to idly move and subsequently move the carrier to or fro, means for variably limiting the movement of the lever, and a clutch device mounted upon the carrier for simultaneously gripping the two flanges to rotate the turn-table frame.

16. In a cheese cutter, the combination with a main frame having a stop device fixed thereon, a stop block adjustably mounted on the main frame oppositely and in proximity to the fixed stop device, a turn-table frame rotatably mounted on the main frame, and a lever pivoted to the main frame and extending movably between the fixed stop device and the adjustable stop block, of a carrier supported upon the lever and guided thereon by the turn-table frame into contact with said stop block, said carrier having a clutch device thereon for gripping said turn-table frame, said device being movable by said carrier into contact with said fixed stop device, and means enabling said lever to move said carrier to and fro.

17. In a cheese cutter, the combination with a turn-table, of a main frame rotatably supporting the turn-table and having a table fixed on one side thereof, said table having a shaft-bearing therein and having also a computing-scale thereon extending concentrically to said shaft-bearing, a disk shaped base plate having a stub axle thereon extending rotatably into said shaft-bearing, said plate being adjacent said scale and having a stop block thereon that is eccentric to said axle, said block and said plate having a curved slot therein, a binding screw in said slot and screwed into said fixed table and having a head in contact with said block, a fixed stop on said main frame, a lever pivoted to said main frame, and clutch mechanism mounted on said lever for rotating said turn-table and movable between said stop block and said fixed stop.

18. In a cheese cutter, the combination with a main frame, a turn-table rotatably mounted on the main frame and having two concentric flanges thereon, and a lever pivoted to the main frame, of a carrier supported upon the lever and having two lugs thereon spaced apart from opposite sides of the lever, said carrier having two guide projections thereon extending between said flanges and having also a stud and an abutment thereon, a clutch device comprising a guide plate supported upon the carrier under said flanges and having a clutch member thereon extending between the flanges, said plate having an arm thereon extending in a plane between said stud and said abutment, and a spring between said abutment and said arm forcing said arm against said stud and also forcing said clutch member into frictional contact with said flanges.

19. In a cheese cutter, the combination with a main frame, a lever pivoted on the main frame, and a turn-table frame rotatably mounted on said frame and having two concentric flanges extending above said lever, of a carrier supported upon said lever under said flanges and having two guide projections thereon extending upward between said flanges for guiding the carrier, means enabling the lever to move the carrier relatively to said flanges, a guide plate movably supported upon the carrier and having a clutch member thereon extending between said flanges, said member being longer circumferentially of said flanges than the distance between the flanges, and means mounted on said carrier coöperating therewith for slightly turning said guide plate to force said clutch member into contact with said flanges.

20. In a cheese cutter, the combination of a main frame having two bearing blocks and also an abutment thereon, the abutment being at one side of the plane of the bearing blocks and having a socket therein that is open toward said plane, one of said blocks having a stud thereon, a turn-table frame rotatably mounted on the main frame and having two concentric flanges adjacently arranged on the under side thereof, a locking bar movably supported upon said bearing blocks in a plane between said abutment and said stud and having a socket therein that is open toward said abutment, said bar having also a clutch member thereon extending between said flanges, said member being longer circumferentially of the flanges than the distance between the flanges, a spring seated in said sockets and forcing said bar against said stud and also forcing said clutch member into contact with said two flanges to lock said turn-table frame against rotation in one direction, and means coöperating with said main frame and said flanges to rotate said turn-table frame in the opposite direction.

21. In a cheese cutter, the combination with a main frame provided with a pivot, a turn-table rotatably mounted on the main frame, a knife frame connected to said pivot, and a cutting knife secured to said knife frame to rest when inactive upon said turn-table, of a casing section supported on said main frame and extending about said turn-table, and a section normally resting on said casing section and pivotally supported to be moved off from said casing section, said cover section when at rest covering said turn-table and also the knife frame and cutting knife when inactive on the turn-table.

22. In a cheese cutter, the combination with a frame, a table on the frame, and a knife movably supported to operate upon the table, of a casing section comprising a supported wall extending about the table adjacent thereto, and a cover section comprising a wall and a continuous top thereon, the wall of the cover section being removably seated upon the casing wall and the top extending over the knife and the table.

23. In a cheese cutter, the combination with a frame having a horizontal pivot, a table on the frame, and a knife movably supported to operate on the table, of a cover for the table and the knife comprising a wall portion having an arm connected to said pivot and a continuous top on the wall normally extending over the knife.

24. In a cheese cutter, the combination with a frame, a table rotatable on the frame, and a clutch carrier guided to move concentrically with the table and having two lugs spaced apart thereon, of a lever pivoted to the frame and extending between the two lugs to move idly and subsequently contact with one of the lugs for moving the carrier, and a clutch movably mounted on the carrier for gripping and moving the table.

25. In a cheese cutter, the combination with a frame having a fixed table, a turn-table mounted on the frame, and a lever pivoted to the frame provided with means for rotating the turn-table, of a stop for the lever fixed on the frame at a distance from the fixed table, a segmentally shaped indicating scale fixed on the fixed table, and a rotary adjustable stop block for the lever comprising a marked disk rotatably mounted on the fixed table adjacent to the scale and having a block thereon that is eccentric to the axis of rotation of the disk, and means for securing the disk to the fixed table.

26. In a cheese cutter, the combination with a main frame having a fixed table, a cheese table rotatably mounted on the main frame, an operating lever pivoted to the main frame, and clutching means carried by the lever for rotating the cheese table, of a circular disk rotatably mounted on the fixed table and having a cylindrical stop block fixed thereon eccentrically to the axis of rotation of the disk and opposite to the lever, and means for fixedly securing the disk to the fixed table.

27. In a cheese cutter, the combination with a main frame having an arm thereon, a table rotatably mounted on the frame, a knife frame pivoted to the arm, and a knife secured to the knife frame, of a stationary cylindrical cover section extending about the table and removably supported on the main frame, the section having an opening therein to receive the rear end of the knife and provided with a closure extending about said rear end and into connection with said arm for guidance, and a movable cover section having a hollow arm pivoted to said frame arm and normally extending over said knife frame to said stationary section and said closure, the movable cover section extending over said knife frame and said table and resting upon said stationary section.

In testimony whereof, I affix my signature in presence of two witnesses.

JOHN WINKELMEYER.

Witnesses:
  CLINT PARKER,
  I. M. HOGLE.

Copies of this patent may be obtained for five cents each, by addressing the "Commissioner of Patents, Washington, D. C."